United States Patent [19]

Muzslay et al.

[11] Patent Number: 5,368,504
[45] Date of Patent: Nov. 29, 1994

[54] SHIELDED CABLE CONNECTOR

[75] Inventors: Steven Z. Muzslay, Huntington Beach; Michael S. Finona, Fountain Valley, both of Calif.

[73] Assignee: ITT Corporation, Secaucus, N.J.

[21] Appl. No.: 807,880

[22] PCT Filed: Dec. 9, 1991

[86] PCT No.: PCT/US91/09209

§ 371 Date: Jan. 28, 1992

§ 102(e) Date: Mar. 27, 1992

[51] Int. Cl.⁵ .............................................. H01R 9/03
[52] U.S. Cl. .................................... 439/610; 439/471
[58] Field of Search ................. 439/92, 95, 96, 98, 439/108, 449, 450, 470, 471, 607, 608, 609, 610

[56] References Cited

U.S. PATENT DOCUMENTS

| | | | |
|---|---|---|---|
| 3,603,913 | 9/1971 | Hasty, Jr. | 439/471 |
| 3,794,959 | 2/1974 | Kamolz | 439/471 |
| 4,925,404 | 5/1990 | Dutcher | 439/610 X |
| 5,046,967 | 9/1991 | Majernik et al. | 439/610 |
| 5,102,351 | 4/1992 | Meshel | 439/610 X |
| 5,123,860 | 6/1992 | Kamei et al. | 439/610 X |
| 5,246,376 | 9/1993 | Schuhl et al. | 439/610 X |

Primary Examiner—Khiem Nguyen
Attorney, Agent, or Firm—Thomas L. Peterson

[57] ABSTRACT

An electrical connector is provided, whose housing is securely connected to the shields of shielded cables while conductors of the cables are connected to contacts of the connector, in a low cost arrangement. A ring (52, FIG. 3) is installed under the braided shield of the cable to provide a bulged shield portion 54 which is pressed against a conductive cable-supporting surface (76, FIG. 4) of the housing. The ring is preferably of elastomeric material, and a simple tie (100, FIG. 6) can surround the cables and a housing retainer (66) to securely hold them together, the tie lying in slots (81-83) of the retainer.

12 Claims, 5 Drawing Sheets

SHIELDED CABLE CONNECTOR

BACKGROUND OF THE INVENTION

Connectors that are attached to shielded cables generally require a means for securely connecting the cable shield to the conductive housing of the connector. Such connection to the shield must occur while one or more central conductors of the cable are connected to contacts of the connector. An emerging use for such connectors is for power cables that can supply current to electric vehicles to recharge their batteries. One current approach uses three separate shielded cables extending to a connector, with the shield of each cable connected to the housing of the connector and with a single central conductor of each cable connected to a contact of the connector. The connector must be designed for mass production at low cost, while reliably connecting to each cable in a manner that facilitate field repairs.

SUMMARY OF THE INVENTION

In accordance with one embodiment of the present invention, an electrical connector is provided for attachment to a shielded cable, which assures reliable electrical connection between the cable shield and the connector housing in a simple, low cost, and easily reparable construction. A ring lies under a portion of the cable shielding to provide a bulged shield portion that can be reliably connected to the housing. The bulged shield portion is pressed against an electrically conductive cable-receiving surface formed on the housing, to provide high pressure for a lower resistance connection.

The ring can be formed of elastomeric material. The cable and other similar cables can be pressed against corresponding cable-receiving surfaces of a retainer, and a tie can surround the cables and retainer to press the bulged portions of all cables securely towards corresponding conductive cable-receiving surfaces. The retainer has arms between cable-receiving surfaces, and the arms have slots that receive the tie to prevent it from moving axially.

The novel features of the invention are set forth with particularity in the appended claims. The invention will be best understood from the following description when read in conjunction with the accompanying drawings.

BRIEF DESCRIPTION OF THE DRAWINGS

FIG. 3 is a partial sectional view of a prepared cable of the connector system of FIGS. 1 and 2.

DESCRIPTION OF THE PREFERRED EMBODIMENTS

Figure 1:
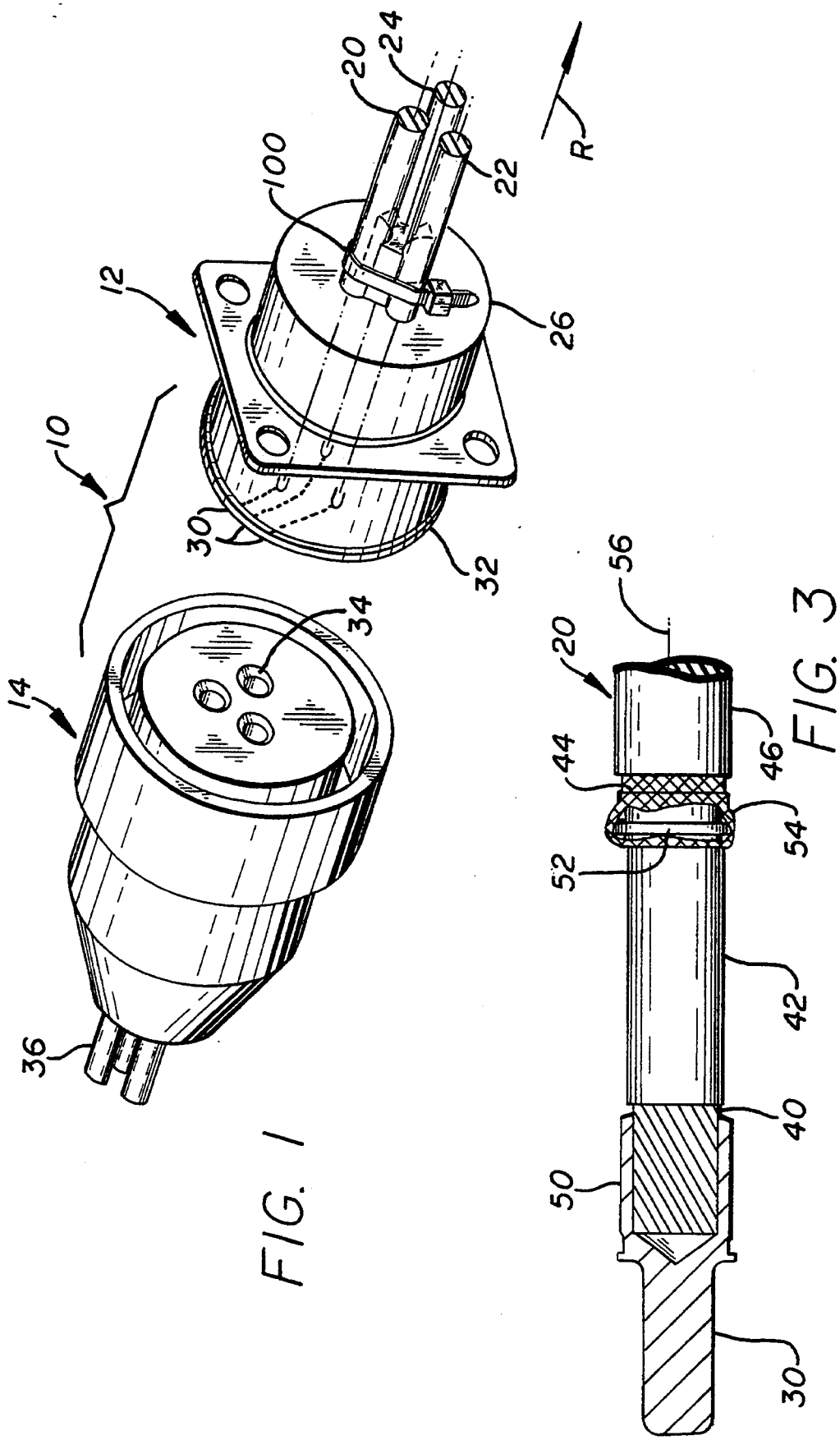
FIG. 1 is an isometric view of a connector system constructed in accordance with the present invention, showing receptacle and plug connectors prior to mating.

FIG. 1 illustrates a connector system 10 which includes a receptacle connector 12 that mates with a plug connector 14. The particular connector 12 is designed to mount on an electrically energized vehicle to receive electrical power for recharging batteries of the vehicle. The receptacle connector 12 is designed to receive power from a utility line to supply power for recharging the batteries. Three shielded cables 20, 22, 24 extend in a rearward direction R from a rear end portion 26 of the receptacle connector, with conductors of the cables connected to corresponding pin contacts 30 at the front end portion 32 of the connector. The pin contacts are designed to mate with corresponding socket contacts 34 of the plug connector, which has three shielded cables 36 extending from its rear end.

As shown in FIG. 3, each shielded cable such as 20 includes a central cable conductor 40, an insulation 42 extending around most of the length of the conductor, a flexible shield 44 extending around most of the length of the insulation, and an outer insulative jacket 46 extending around most of the length of the flexible shield. The pin contact 30 has a rear part 50 that is crimped onto the cable conductor 40. A means is required to reliably electrically connect the flexible shield 44 of the cable to the conductive housing of the connector in a low cost manner that facilitates repairs.

In accordance with the invention, applicant provides a ring element or ring 52 which lies beneath the flexible shield 44 to create a bulge at 54 in the shield on either side of the ring. The shield 44 is a braiding formed of multiple strands of stainless steel, which is maintained at ground electrical potential. The ring 52 can be installed in a number of ways, as by first slipping the ring over the shield 44, and then folding a portion of the shield backward over the ring and itself. The shield extends largely in the form of a tube centered on the axis 56 of the cable except for the backward-folded portion that forms a bulge around the ring. The bulge 54 in the flexible shield provides a region that can be pressed with high pressure against the conductive housing of the connector to establish good electrical contact between the shield and the housing.

Figure 4:
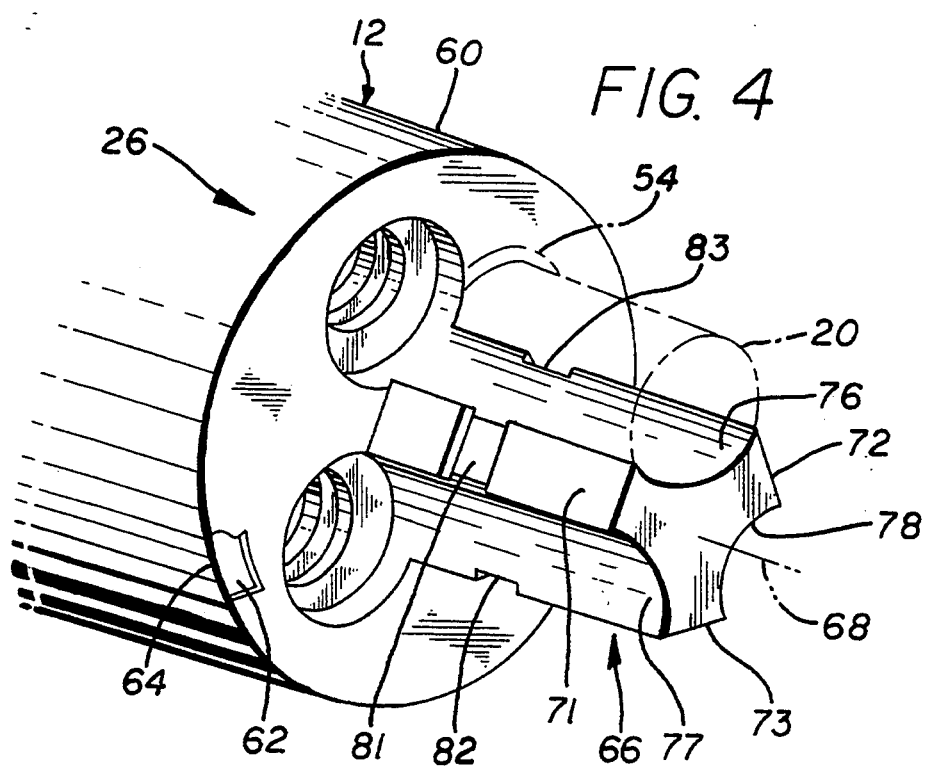
FIG. 4 is a partial rear isometric view of the receptacle connector housing of the connector system of FIGS. 1 and 2.

FIG. 4 illustrates the rear end portion 26 of the housing 60 of the connector 12. The housing is electrically conductive, in that it has an electrically conductive surface. Applicant prefers to form the housing 60 with an injection-molded thermoplastic body 62 that is not highly electrically conductive. Applicant then plates the body with a highly electrically conductive plating 64 of copper and nickel. The conductive plating form an electromagnetic barrier to minimize emission of electromagnetic waves. Of course, the entire housing could be formed of conductive material. The housing rear portion includes a retainer 66 that is largely in the form of a "Y" as viewed along the axis 68 of the connector. The retainer has three thick arms 71–73 radiating from the axis, and forms three concave cable-supporting surfaces 76–78 that each extends between and along each pair of adjacent arms. Applicant places each cable such as 20 on one of the cable-support surfaces such as 76, with the bulge 54 positioned to lie against the surface.

Figure 5:
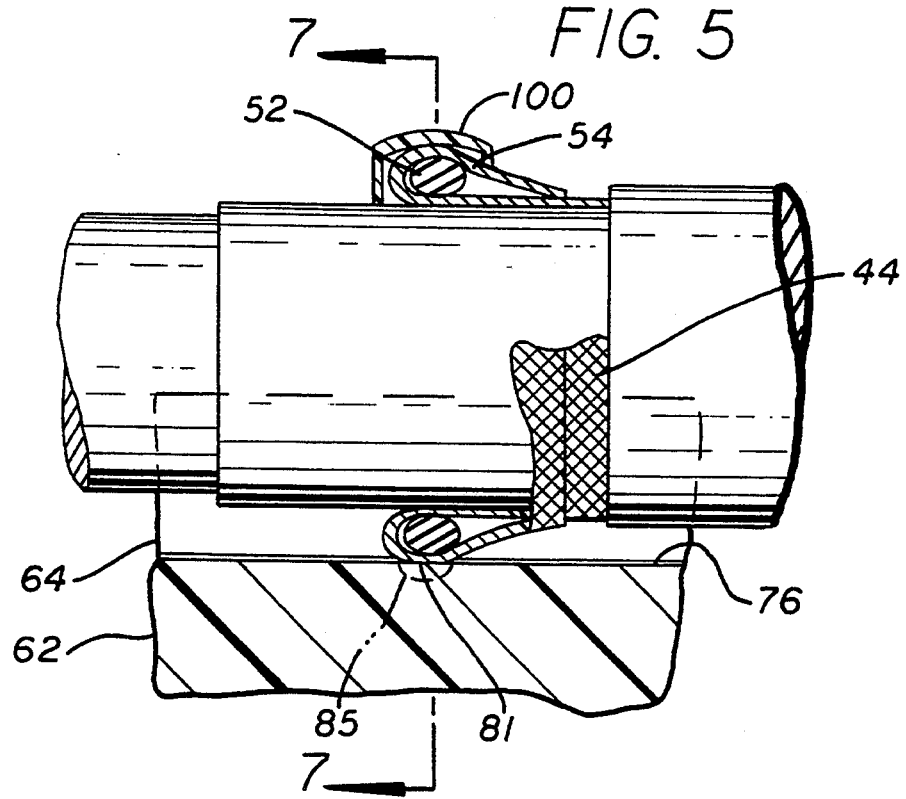
FIG. 5 is a partial sectional view of the receptacle connector of FIG. 1.

As shown in FIG. 5, applicant uses a tie wrap 100 to hold the cables on the retainer. The tie wrap 100 presses the bulge 54 in the braided shield 44 firmly against the cable-support surface 76. The fact that the tying force applied by the tie device 100 presses a small area 81 of the shield against the conductive surface 76, results in high pressure-low resistance electrical contact between the shield 44 and the conductive surface 76.

Figure 6:
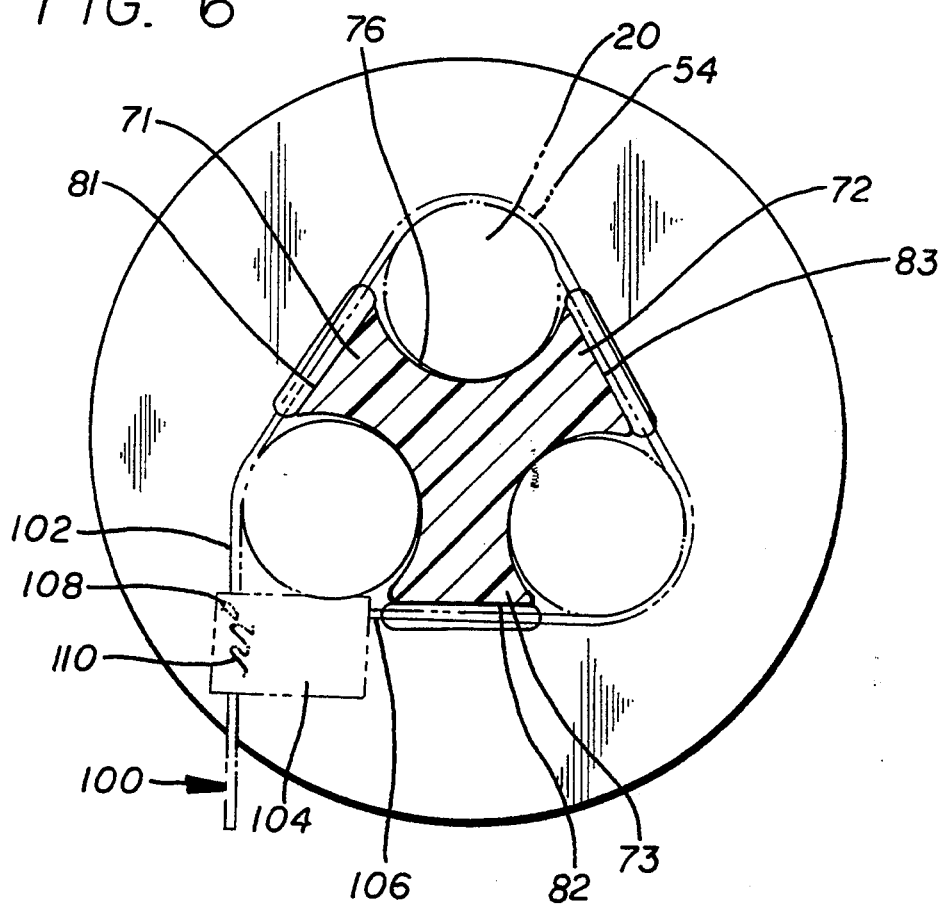
FIG. 6 is a rear end view of the housing of FIG. 4, and showing, in phantom lines, the fully installed cables.

As indicated in FIG. 6, the tie wrap includes a flexible band 102 and a band latch 104. One end 106 of the band is fixed to the latch 104, while the other end passes through a slot in the latch 104, where a resilient finger 108 engages teeth 110 on the band to prevent its loosening. Such tie wraps are widely used in the automotive industry to tie groups of cables together. Such wraps are available at very low cost, and refinements in their design have been made over the years so that they are highly reliable in tying cables or the like tightly together. By the use of such bands to hold the cables to the housing, and to press the bulges against the cable-supporting surfaces to provide high contact pressure between the cable shield and the housing, applicant provides a low cost way for holding the cables to the housing. The finger 108 of tie devices can be readily deflected away from the teeth of the band to remove the tie device, for repair of the connector.

Figure 7:
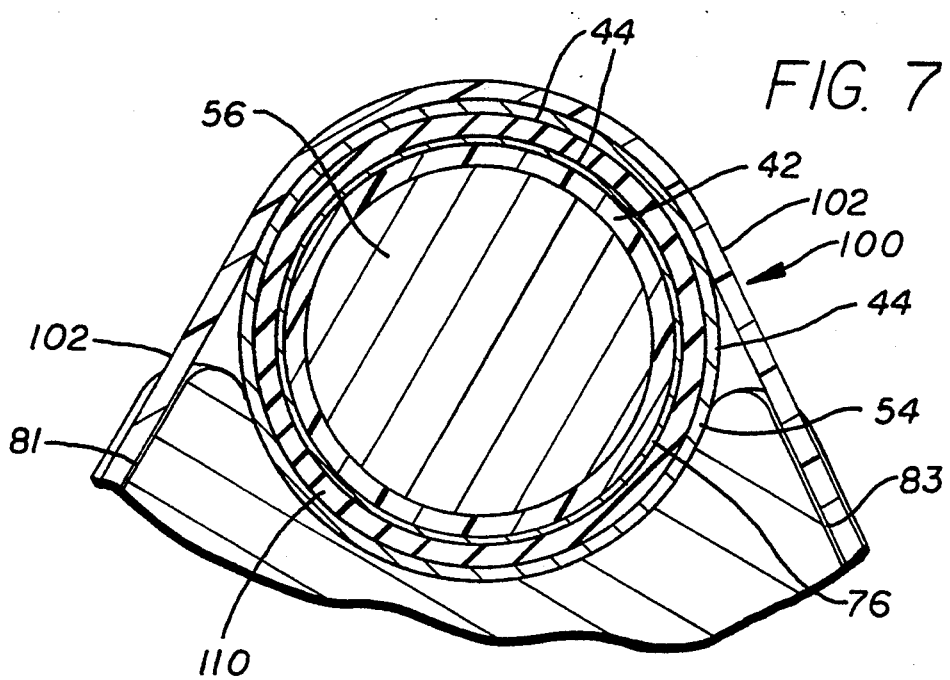
FIG. 7 is a partial sectional view taken on the line 7—7 of FIG. 5.

The retainer 66 (FIG. 4) has three slots 81–83, that each extend perpendicular to the housing axis 68 and across the radially outer surface of each of the arms 71–73. As shown in FIGS. 6 and 7, the band 102 of the tie device extends through the slots 81–83, which keep the band in a fixed position along the length of the retainer.

Although the tie devices are flexible, they are not highly elastic. Applicant prefers to form the ring 52 of elastomeric material such as soft rubber, and uses what is commonly referred to as an O-ring. Such rings are available at low cost. The elasticity of the O-rings assure continued firm pressure between the cable shields and the conductive housing surface, despite any slight loosening of the tie due to changes in temperature and the like. The cable-receiving surface 76 preferably has about the same radius of curvature as that of the cable, or of the bulge 54. The surface 76 can be provided with a groove 85 (FIG. 5) therein to prevent axial movement of the bulge 54, to assure that the bulge does not move from beneath the tie band 102.

Figure 2:
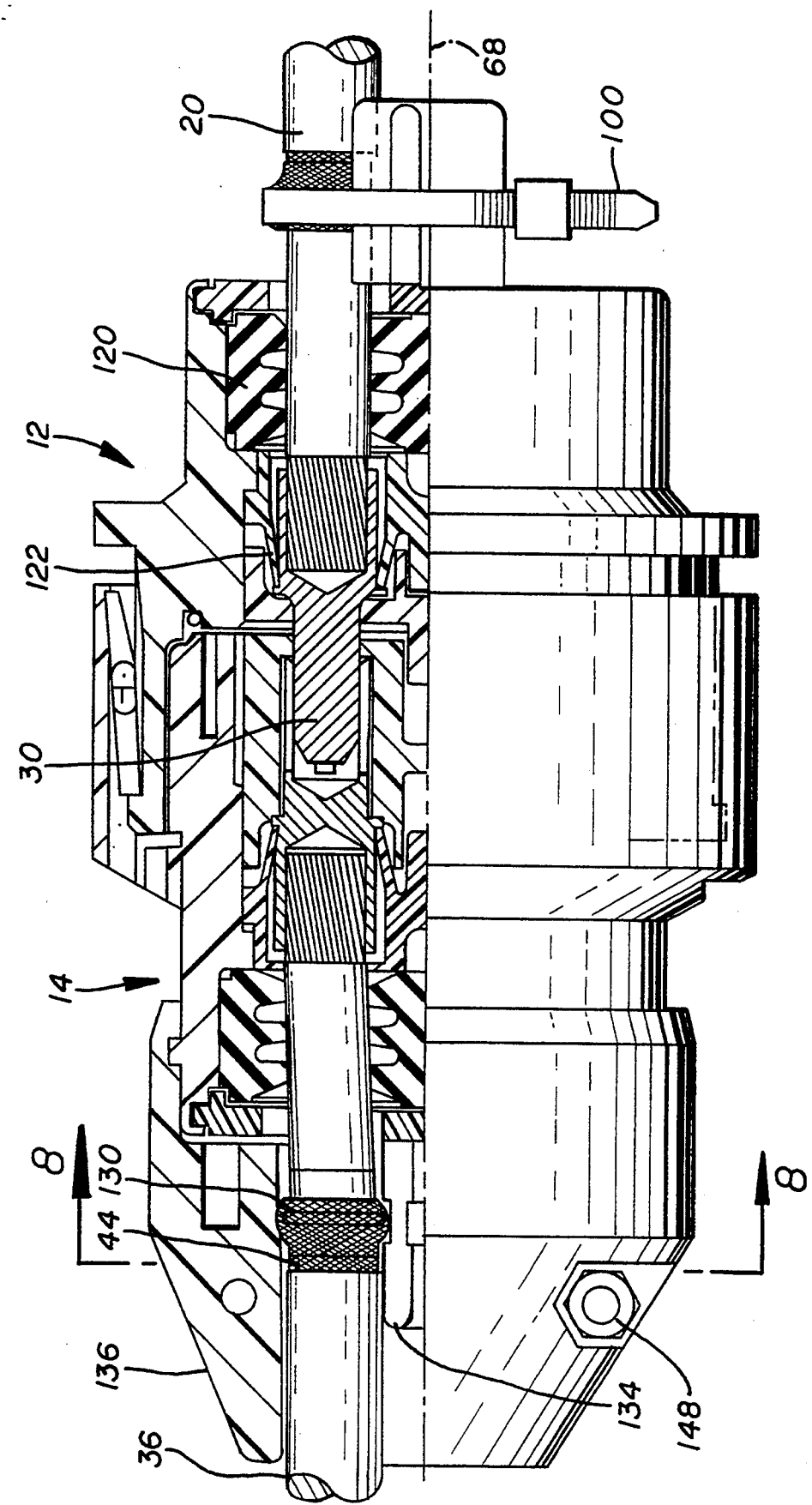
FIG. 2 is a partial sectional view of the connector system of FIG. 1, with the connectors fully mated.

To connect a cable to the connector, applicant first prepares the cable as shown in FIG. 3, with various parts of it trimmed, with the ring 52 installed, and with the shield 44 wrapped backward to lie around the ring and form the bulge 54. As shown in FIG. 2, the cable is then inserted through a rubber grommet 120 until a retainer 122 snaps behind a shoulder on the pin contact 30 to hold it in place. The same procedure is followed for the other two shielded cables. Finally, the tie wrap 100 is tightly wrapped about the bulging portions of the cable shields to securely hold the cables on the retainer and assure good electrical contact between the cable shields and the conductive surfaces of the retainer.

Figure 8:
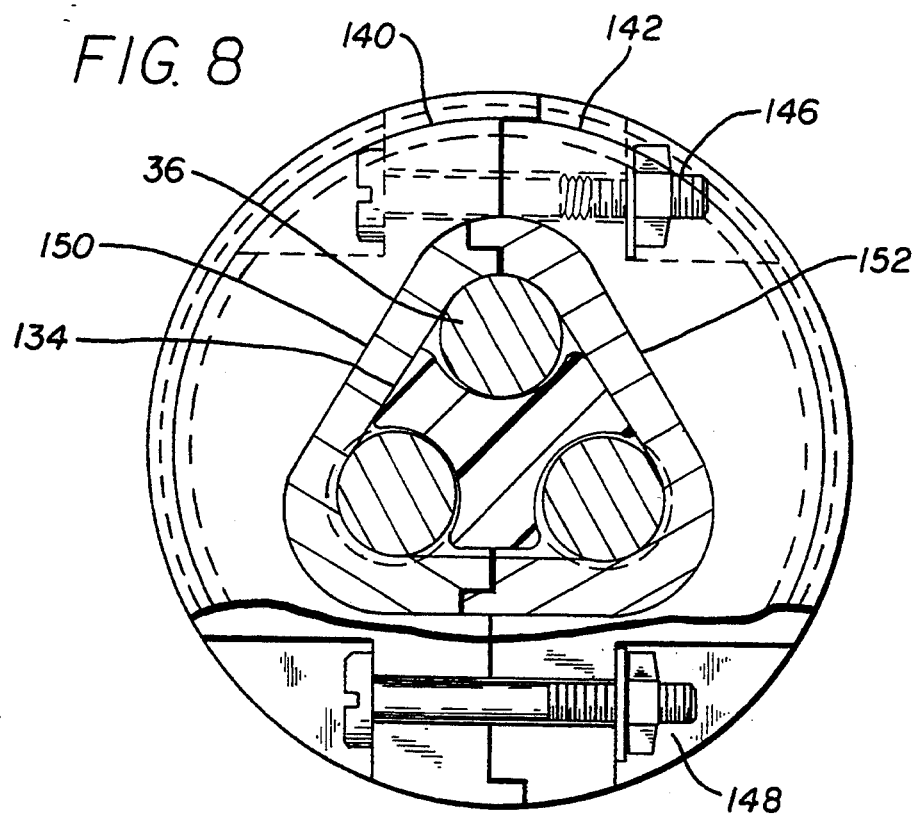
FIG. 8 is a sectional rear end view of the plug connector of FIG. 2, taken on the line 8—8 of FIG. 2.

As shown in FIG. 2, the plug connector 14 also has shielded cables such as 36 which are of similar construction to that of the shielded cable 20. The cable 36 includes an O-ring 130 lying within a folded-back cable braided shield 44, which lies on a retainer 134. However, instead of using a tie wrap, applicant forms a rear portion 136 of the plug connector housing in two parts 140, 142 (FIG. 8) that are tied together by screw and nut fasteners 146, 148. When the two parts 140, 142 are fastened together and approach one another, surrounding elements 150, 152 of the parts 140, 142 press the bulges in the cables such as 36 against the retainer 134 to securely hold the cables in place and to make good electrical connections with their shields in the same manner as for the receptacle connector, except that two rigid housing parts are used instead of a tie wrap.

Figure 9:
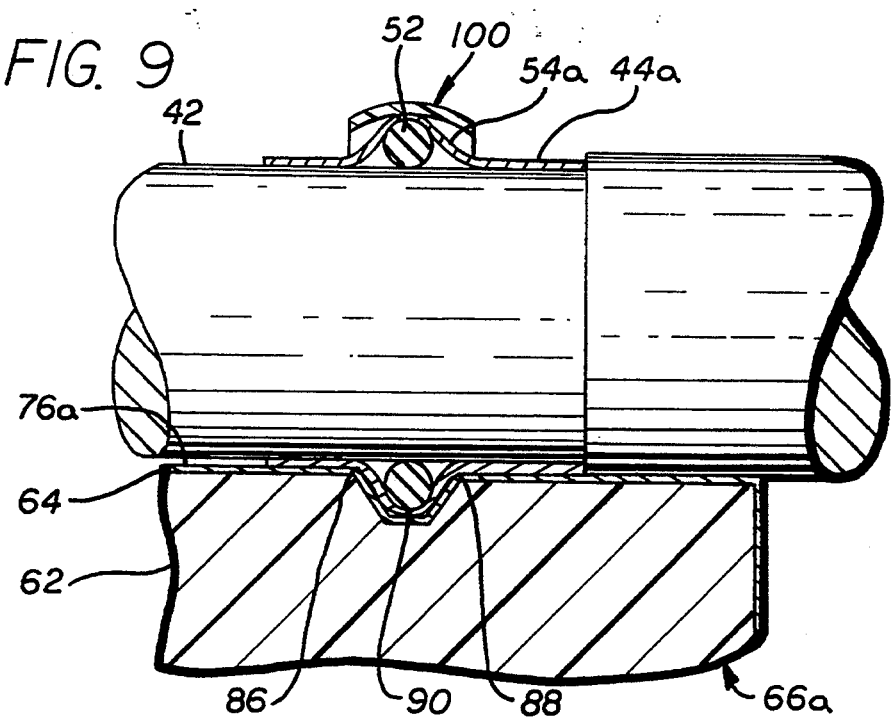
FIG. 9 is a view similar to that of FIG. 8, but showing a modified cable.

FIG. 9 illustrates another assembly that is similar to that of FIG. 5, except that the elastomeric ring 52 is installed against the cable insulation 42, and the braided shield 44A lies only around the outside of the ring to form a bulge at 54A. Also, the cable-supporting surface 76A of the retainer 66A, has a groove 90 in which the bulge 54A lies. The pressure applied by the tie 100 forces the bulge 54A into the groove 88, to establish contact between outer corners 86, 88 of the groove and the shield 44A.

Thus, the invention provides an electrical connector and shielded cable combination, which assures good electrical connection between the shield of a cable and a conductive surface of the connector housing, in a low cost manner that facilitates assembly and disassembly. A ring is provided that lies under the cable shield to form a protrusion or bulge around the ring, that facilitates obtaining high pressure contact of the shield and a conductive surface of the connector housing. The connector housing includes a retainer with a cable-supporting surface. With the cable, especially the bulge around the ring thereof, pressed towards the cable-supporting surface, high pressure contact is established between the surface and shield. A plurality of such cables can be tightly secured to the housing by a tie wrap. The retainer includes grooves that receive the tie wrap to prevent it from moving axially. Each ring is preferably formed of elastomeric material to provide resilience that assures tight contact despite loosening of the tie wrap or other device that presses the cable towards the cable-supporting surface.

The novel features of the invention are set forth with particularity in the appended claims. The invention will be best understood from the following description when read in conjunction with the accompanying drawings.

We claim:

1. An electrical connector which includes a housing with a forward mating end portion and a rear end portion, a plurality of contacts with portions at said forward end portion, and at least a first shielded cable extending from a first of said contacts and extending rearwardly of said housing, wherein said cable includes a conductor, an insulation around said conductor, and a flexible shield around said insulation, characterized by:
    a ring lying closely around and in contact with said first cable with a portion of said flexible shield lying about said ring to form a bulge in said shield;
    said housing having a conductive cable-receiving surface and said shield lies against said cable-receiving surface;
    said connector including a part which presses only one side of said shield bulge, but not an opposite thereof, against said conductive cable-receiving surface.

2. The electrical connector described in claim 1 wherein:
    said ring is formed of elastomeric material.

3. The electrical connector described in claim 1 wherein:

said connector includes a plurality of said shielded cables including said first cable, with each cable having a ring and a shield portion lying about a corresponding ring to form a bulge;

said housing has an axis and includes a retainer having a plurality of said cable-receiving surfaces, with an imaginary line normal to each surface extending largely radial to said axis, with each of said cables lying against one of said surfaces; and a tie wrap which includes a flexible band with opposite end portions and with a middle extending tightly around said bulges of said plurality of cables to hold them tightly around said retainer with said tie wrap also including a band latch which engages said end portions to prevent loosening of said middle around said cables.

4. The electrical connector described in claim 3 wherein:

said retainer forms a plurality of arms extending largely radial to said axis, with each pair of adjacent arms forming a cable-receiving surface between them;

each arm having a radially outer end with a slot that receives said band to prevent axial movement of said band along said retainer.

5. The electrical connector described in claim 1 wherein:

said cable-receiving surface has a groove extending substantially perpendicular to the portion of said cable lying against said surface, and said bulge lies at least partially in said groove.

6. An electrical connector comprising:

a housing having a forward end portion which can mate with another connector and having a rear end portion with a plurality of electrically conductive cable-receiving surfaces;

a plurality of contacts mounted in said housing, each contact having a mating end lying in said housing forward end portion;

a plurality of elongated cables, each having a cable axis, a central conductor connected to one of said contacts, an insulation lying around most of the length of said central conductor, and a flexible conductive shield lying about most of the length of said insulator, each cable lying on one of said cable-receiving surfaces;

a ring of elastomeric material lying around said insulator of each of said cables, with a portion of said shield lying around each said ring to form a bulge in the shield, with the bulge lying against one of said cable-receiving surfaces;

means for pressing against said cables only in directions primarily perpendicular to said cable axes, to press said bulges firmly against said surfaces to provide high pressure contact between each shield and a corresponding cable-receiving surface.

7. The electrical connector described in claim 6 wherein:

said means for pressing comprises a band of flexible material wrapped tightly about said plurality of cables, on said bulges thereof.

8. A method for the assembly of a connector having an axis and a housing with a forward end portion and a plurality of contacts with mating ends at said forward end portion for mating with contacts of another connector, and at least one shielded cable that includes a conductor, an insulator around most of said conductor, and a shield around most of said insulator, with said conductor connected to one of said contacts, characterized by:

installing a ring on said cable with a portion of said cable shield lying around said ring to form a bulge;

forming said housing with an electrically conductive cable-supporting surface;

laying said cable on said surface and pressing only one side of said bulge in said shield toward said surface.

9. A method described in claim 8 wherein:

said ring is of elastomeric material, and said step of pressing includes elastically compressing a portion of said ring lying substantially opposite said surface.

10. The method described in claim 8 wherein:

said step of forming includes forming a retainer with a plurality of cable-supporting surfaces spaced about said axis, with each said surface oriented so a line normal to the surface extends substantially radial to said axis, and with retainer arms lying between pairs of said surfaces;

said step of laying includes laying a plurality of cables each on a different one of said cable supporting surfaces;

said step of pressing includes wrapping and tightening a flexible tie around said bulges of said cables and said retainer.

11. An electrical connector which includes a housing with a forward mating end portion and a rear end portion and with a housing axis, a plurality of contacts with portions at said forward end portion, and a plurality of shielded cables extending from a first of said contacts and extending rearwardly of said housing, wherein each of said cables includes a conductor, an insulation around said conductor, and a flexible shield around said insulation, characterized by:

a ring lying around the insulation of said first cable with a portion of said flexible shield lying about said ring to form a bulge in said shield;

said housing having a conductive cable-receiving surface and said shield lies against said cable-receiving surface;

said connector including a part which presses at least one location on said shield bulge against said conductive cable-receiving surface;

said housing has a rear end portion with an integral retainer of largely Y-shaped cross-section, as viewed along said axis, forming three arms largely radiating from said axis, said retainer forming three concave cable-support surfaces each extending between and along each pair of adjacent arms, and said plurality of cables includes said first cable and second and third cables with each cable lying on a different one of said cable support surfaces and with each cable having an axis extending substantially parallel to said housing axis along said retainer, and with second and third rings mounted on said second and third cables under the shields thereof, to form second and third bulges in said shields, with said part which presses being in the form of a flexible band that extends tightly around all of said bulges.

12. An electrical connector comprising:

a housing having a forward end portion which can mate with another connector, having a rear end portion with a plurality of electrically conductive cable-receiving surfaces, and having an axis, said housing rear end portion having a retainer of largely Y-shaped cross-section as viewed along said axis, forming three arms radiating from said axis, said retainer forming three concave cable-support surfaces each extending between and along each pair of adjacent arms;

a plurality of contacts mounted in said housing, each contact having a mating end lying in said housing forward end portion;

first, second, and third elongated cables, each having a central conductor connected to one of said contacts, an insulation lying around most of the length of said central conductor, and a flexible conductive shield lying about most of the length of said insulator, each cable lying on a different one of said cable-receiving surfaces, with each cable having an axis extending substantially parallel to said housing axis along said retainer;

first, second, and third rings of elastomeric material each lying around said insulator of each of said cables, with a portion of each of said shields lying around each said ring to form a bulge in the shield, with each bulge lying against one of said cable-receiving surfaces;

means for pressing said bulges firmly against said surfaces to provide high pressure contact between each shield and a corresponding cable-receiving surface.

* * * * *